United States Patent [19]
Nishida et al.

[11] Patent Number: 5,394,288
[45] Date of Patent: Feb. 28, 1995

[54] ACTUATOR

[75] Inventors: Toru Nishida, Kumagaya; Naoki Kobayashi, Gyoda, both of Japan

[73] Assignee: Jeco Company Limited, Japan

[21] Appl. No.: 989,043

[22] Filed: Dec. 10, 1992

[30] Foreign Application Priority Data

Dec. 20, 1991 [JP] Japan .............. 3-105548[U]
Jan. 16, 1992 [JP] Japan .............. 4-001153[U]
Feb. 19, 1992 [JP] Japan .............. 4-006847[U]

[51] Int. Cl.$^6$ ....................... H02H 5/04
[52] U.S. Cl. ....................... 361/31; 361/23; 74/89.15
[58] Field of Search .............. 361/23, 24–27, 361/58, 31; 310/83, 80, 68 L; 74/89.15; 318/475; 192/143; 49/324, 334

[56] References Cited

U.S. PATENT DOCUMENTS 3,161,074 12/1964 Korthaus et al. .......... 74/424.8 R
3,269,199 8/1966 Deehan et al. .......... 74/89.15
4,716,486 12/1987 Sobiepanek et al. .......... 361/24

Primary Examiner—A. D. Pellinen
Assistant Examiner—Sally Medley
Attorney, Agent, or Firm—Ladas & Parry

[57] ABSTRACT

An actuator in which an output shaft can be made to stop by a simple structure and in which actuator assured restart of the output shaft can be performed. The actuator comprises a motor, an output shaft provided with an external threading, and a connecting member having an internal threading engaged with the external threading of the output shaft. The actuator further comprises a resilient member for applying a predetermined load to the output shaft when the output shaft reaches the end of its moving range. The connecting member may comprise an internal screw member having a first protrusion formed on an outer surface thereof and a gear member having a second protrusion. When the second protrusion impacts with the first protrusion, a large starting torque is obtained. Further, two PTC thermistors are provided in a protection circuit, each thermistor allows flow of a current in only one direction, so as to prevent a reduction of a starting current.

10 Claims, 7 Drawing Sheets

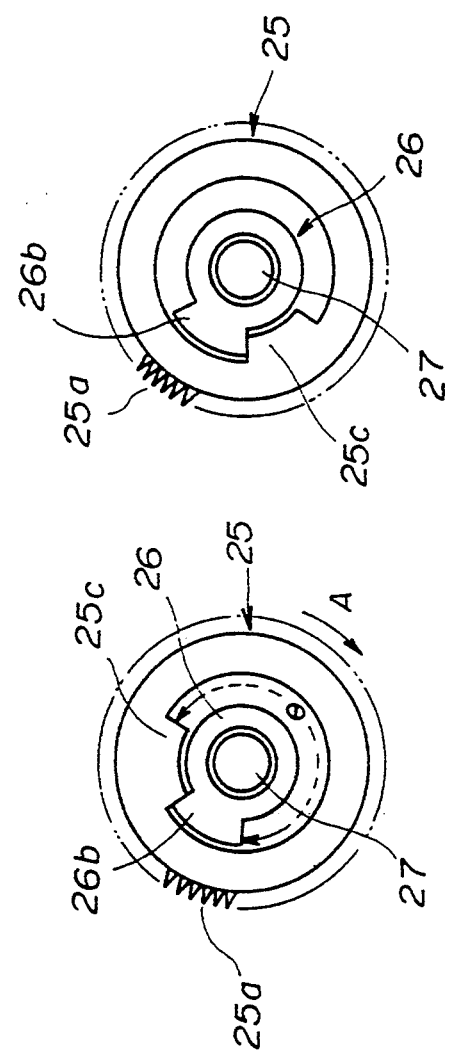

ns us# ACTUATOR

BACKGROUND OF THE INVENTION

The present invention generally relates to an actuator, and more particularly to an actuator having an output shaft which performs a reciprocating linear movement by means of a screw mechanism.

Conventionally, as a source of linear movement, an actuator is known in which a reciprocating linear movement is obtained by means of causing an output shaft formed with an external threading to engage with a rotational gear formed with an internal threading. Such an actuator mainly employs an electric motor for a power source; and a rotational motion of the motor is converted into a reciprocating linear motion.

FIG. 1 is a cross sectional view of an example of a conventional actuator. A pinion gear 2 is fixed on an rotational shaft 1a of a motor 1, and a gear 3a formed on an outer portion of an internal threading gear 3 is engaged with the pinion gear 2. There is formed an internal threading (inner screw) 3b on an inner side of the internal threading gear 3. An external threading (outer screw) 4a of a screw shaft (output shaft) 4 is engaged with the inner screw 3b.

When the motor starts to rotate, the pinion gear rotates and the internal threading gear 3 engaged with the pinion gear 2 starts to rotate. As the internal threading gear 3 rotates, the inner screw 3b rotates.

The screw shaft 4 engaged with the inner screw 3b is not allowed to rotate, as a pin 4b provided on one end of the screw shaft is fitted into a guide groove 5a formed on a casing 5. Accordingly, by a screw principle, when the inner screw rotates, the screw shaft performs a linear motion in directions indicated by arrows $A_1$, $A_2$.

Conventionally, in an actuator having the above mentioned mechanism, a movement of a screw shaft is limited by causing an end of the screw shaft to come in contact with an inner surface of a casing, or by making a pin, which is provided for preventing a rotation of the screw shaft, come in contact with an end of the guide groove. In such a structure in which a movement of a screw shaft is caused to stop, a large fastening torque is applied to an engaging portion of the screw shaft due to an inertia of the screw shaft and an inertia of the motor when the screw shaft is caused to stop. This fastening torque sometimes exceeds the maximum starting torque of the motor. When such a condition occurs, the motor is not able to restart in a reverse direction (it is required, for starting of the motor, to move the screw shaft in a reverse direction) as the shaft is fastened with a torque greater than the maximum starting torque generated by the motor.

That is, in a conventional actuator of such type, a torque greater than the maximum starting torque of a motor is applied to a screw due to an inertia of the motor when the shaft is forced to stop by means of a stopper. For example, the applied fastening torque (the torque applied in order to stop the motor) is four or five times as large as the maximum starting torque of the motor. The unfastening torque (the torque applied in order to restart the motor) is, depending upon the coefficient of friction, approximately 80% of the fastening torque. Accordingly, an unfastening torque three to four times larger than the maximum starting torque of the motor is required; thus the motor is unable to start by means of only its own starting torque in this condition (unfastening torque > starting torque).

Therefore, when a structure is employed, in which a screw shaft is forced to stop, it is common to use a ball screw that has a coefficient of friction smaller than that in an ordinal screw. However there is a problem in that ball screws are expensive and thus a manufacturing cost of the actuator greatly increases.

Additionally, in an actuator having the above mentioned structure, since there is a possibility of burning out a motor coil due to an excessive current flowing in the motor when the screw shaft is forced to stop, a protection circuit is provided for limiting an excess current. However, there is a problem in that a motor is not able to restart in a reverse direction due to an effect of the protection circuit.

FIG. 2 is a circuit diagram of an example of a conventional protection circuit. In the figure, numeral 1 denotes a DC (direct current) motor. One terminal of the motor 1 is directly connected to a driving circuit 8 for the motor 1, while the other terminal is connected to the driving circuit via a PTC (Positive Temperature Coefficient) thermistor 7 which serves for preventing burnout of a coil of the motor 1. Accordingly, a current flowing to the motor 1 is supplied from the driving circuit 8 via the PTC thermistor 7.

The PTC thermistor 7 generates a heat when a current flows therein. Due to this heat, temperature of the PTC thermistor 7 rises, resulting in an increase of the resistance thereof. Accordingly, when a current flows to the coil of the DC motor 1, resistance of the PTC thermistor 7 increases and the current is restricted. Therefore, no excessive current flows to the DC motor 1 and thus the DC motor 1 is protected from an excess current.

As mentioned above, the conventional protection circuit has a thermistor connected in parallel between the driving circuit 8 and the PTC thermistor 7. In this structure, when supplying a current to a motor, in a reverse direction, immediately after supplying a current in a normal direction, resistance of the thermistor 7 remains at a value corresponding to the current flowing in the normal direction.

Therefore, there is a problem in that the motor is unable to restart in a reverse direction when resistance of the PTC thermistor is larger than normal due to an excess current for the normal direction having been supplied in order to force stop the motor.

SUMMARY OF THE INVENTION

It is a general object of the present invention to provide a novel and useful actuator in which the above mentioned disadvantages are eliminated.

A more specific object of the present invention is to provide an actuator in which an output shaft can be forced to stop with a simple structure and in which assured restart of the output shaft can be performed.

Another object of the present invention is to provide a mechanism of an actuator that eliminates an over fastening that occurs, due to a screw principle, when an output shaft is forced to stop.

Another object of the present invention is to provide a mechanism of an actuator that enables restarting of an output shaft by applying a shock force.

Another object of the present invention is to provide a protection circuit that can perform a normal current supply operation when a reverse rotation of a motor is performed immediately after a motor is stopped by an overload.

In order to achieve the above mentioned objects, an actuator according to the present invention comprises:
a motor;
an output shaft provided with an external threading formed on an outer periphery thereof;
a connecting member, having an internal threading engaged with the external threading of the output shaft, coupled to a rotational shaft of the motor so as to rotate about the output shaft; and
a deceleration means for decelerating a moving speed of the output shaft at the end of the moving range of the output shaft.

According to the present invention, since the output shaft stops while being decelerated by the decelerating means, an excessive fastening torque is not applied to an engaging portion of the output shaft. Accordingly, tightening of the external threading of the output shaft relative to the internal threading of the connecting member is prevented and an overload to the motor is reduced, thus the motor can restart without fail.

Additionally, by having a shock applying means, even if the external threading of the output shaft is tightened with the internal threading of the connecting member, a torque sufficient to unfasten the threadings is obtained by means of a shock force applied by the shock applying means.

Further, an actuator according to the present invention may have a protection circuit in which two protection elements are provided connected in parallel. A rectifier is provided for each protection element so that a current flowing in either the normal direction or in the reverse direction may pass through any of the protection elements.

Other objects, features and advantages of the present invention will become more apparent from the following detailed description when read in conjunction with the accompanying drawings.

BRIEF DESCRIPTION OF THE DRAWINGS

FIGS. 4, 4A and 4B are cross sectional views for explaining an operation of the embodiment shown in FIG. 3; FIG. 4A shows a state where an end of a screw shaft is engaged with a front spring; and FIG. 4B shows a state where the screw shaft is stopped;

FIGS. 7, 7A and 7B are views for explaining a relative position between a gear and an inner screw shown in FIG. 6; FIG. 7A shows a state where the screw shaft is stopped; and FIG. 7B shows a state where the gear is reversely rotating.

DETAILED DESCRIPTION OF THE PREFERRED EMBODIMENTS

Figure 1:
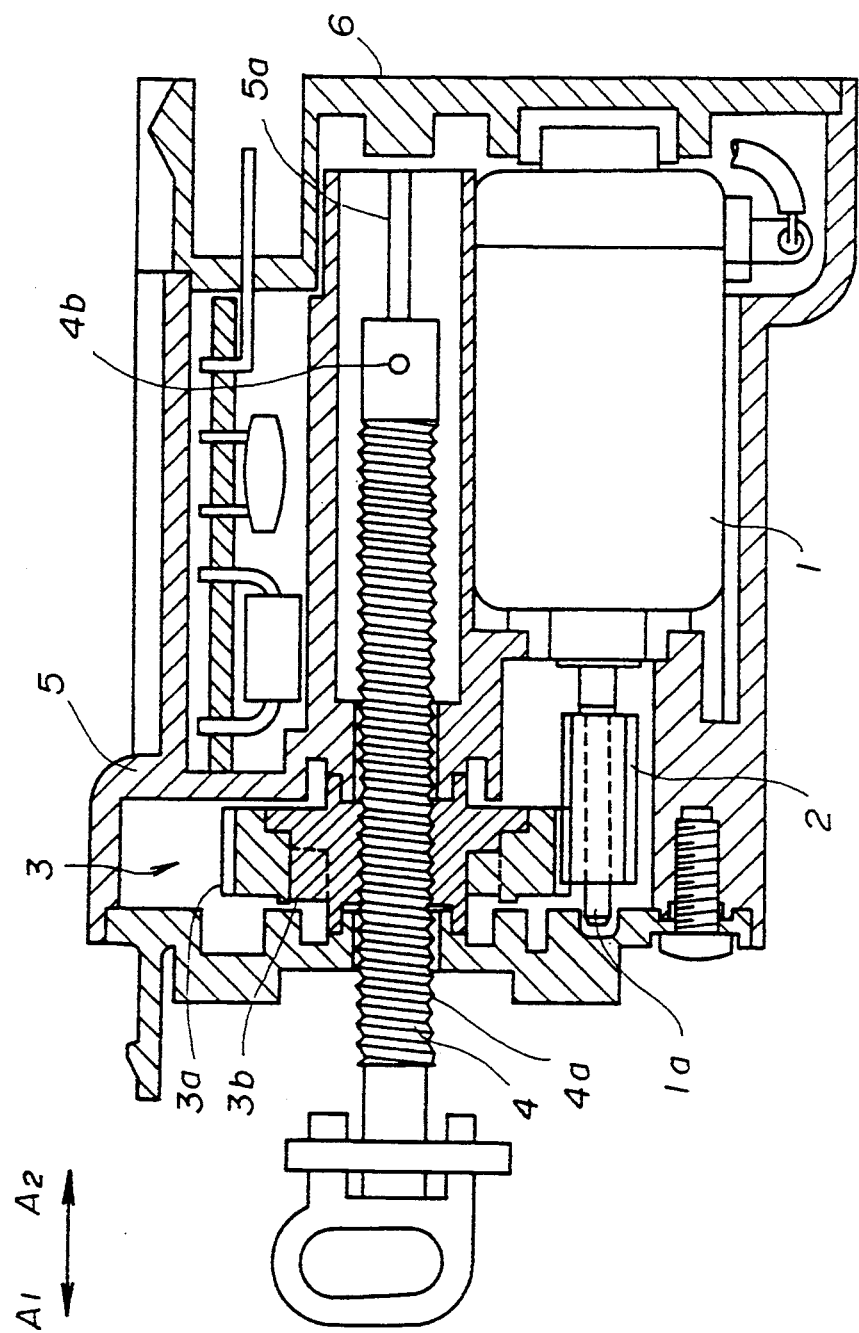
FIG. 1 is a cross sectional view of an example of a conventional actuator.
Figure 2:
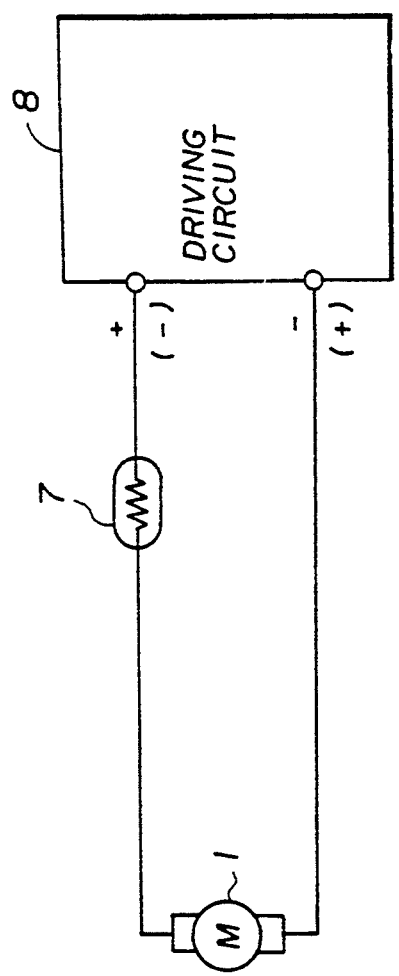
FIG. 2 is a circuit diagram of an example of a conventional protection circuit.
Figure 3:
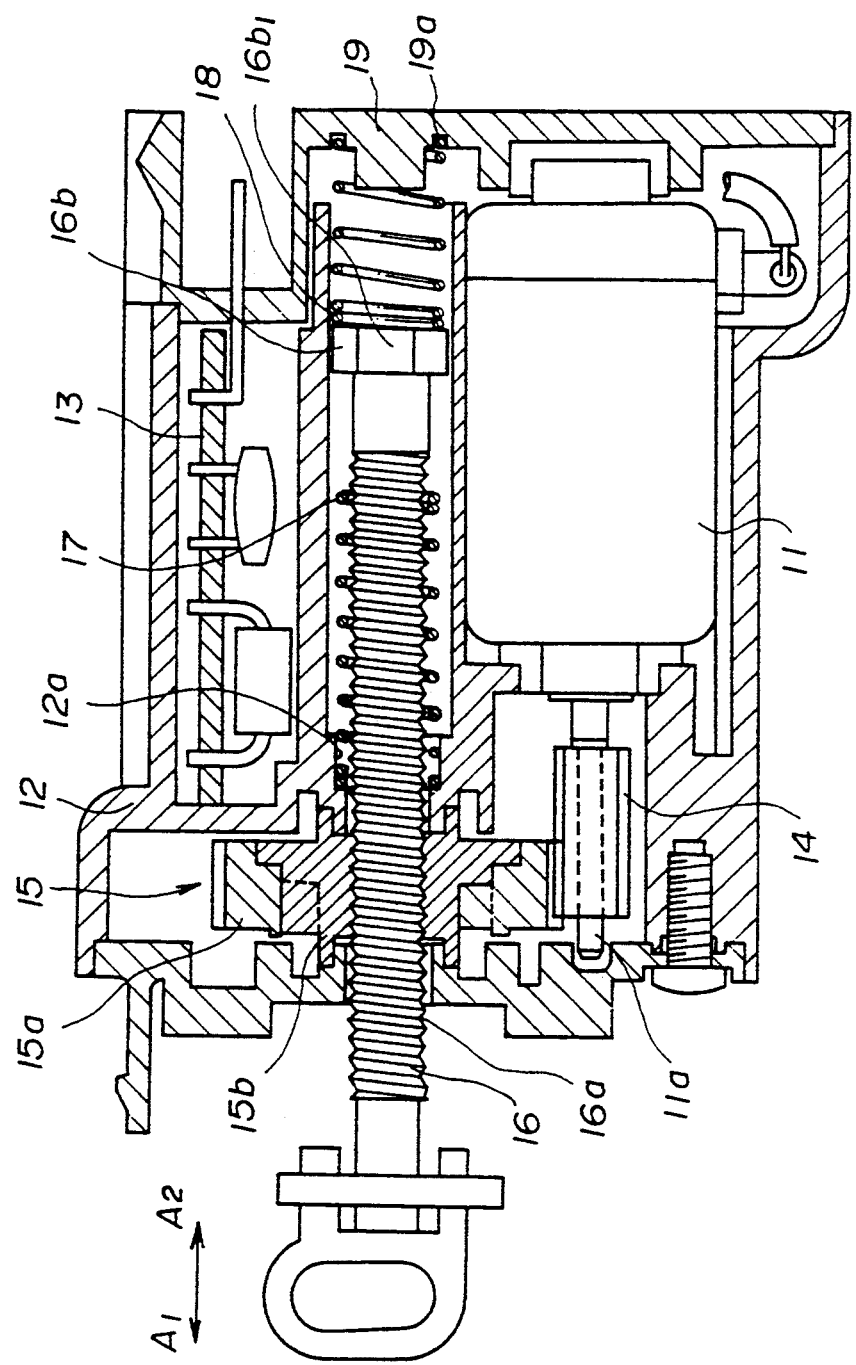
FIG. 3 is a cross sectional view of a first embodiment according to the present invention.

A description will be given of a first embodiment with reference to FIG. 3. FIG. 3 is a cross sectional view of the first embodiment according to the present invention. A motor 11 is mounted in a casing 12 that is a main body of an actuator, and the motor is electrically connected to an external circuit via a circuit board 13 having a motor protection circuit. A pinion gear 14 is mounted on a rotational shaft 11a of the motor 11, and a gear 15a of an internal threading gear 15 is engaged with the pinion gear 14. An inner screw 15c formed on an inner screw member 15b, which inner screw member 15b integrally rotates with the gear 15a, is engaged with an outer screw 18a of a screw shaft 16 that is an output shaft.

One end of the screw shaft 16 extends outside the casing 12, and the other end is situated inside the casing 12. A spring contact portion 16b having a diameter larger than an outer diameter of the outer screw 16a is formed on the end of the screw shaft 16 situated inside the casing 12. A flat portion 16b₁ is formed on the spring contact portion 16b on the side surface thereof. Because the shape of the spring contact portion 16b corresponds to a shape of a portion of the casing along where the screw shaft 16 moves, rotation of the screw shaft 16 is prevented and thus the screw shaft performs a linear movement.

A spring seating hole 12a is formed inside the casing 12 at a portion thereof with which an end of the screw shaft 16 makes contact when the screw shaft 16 moves in a direction indicated by an arrow $A_1$ of FIG. 3. A front spring 17, which is a coil spring and has a predetermined length, is loosely fitted over the screw shaft 16, and one end of the front spring is pressed into and fixed in the spring seating hole 12a.

A rear spring 18, which is a coil spring and has a predetermined length, is situated on the other side (relative to the front spring 17) of the spring contact portion 16b so that the center axis of the rear spring 18 aligns with the center axis of the screw shaft 16. The end of the rear spring 18 across from the spring contact portion 16b is pressed into and fixed to a circular groove 19a formed inside an end case 19 in a portion facing the spring contact portion 16b.

Next, a description will be given of an operation of the first embodiment with reference to FIGS. 4A and 4B.

When the motor 11 is actuated that the rotational shaft 11a rotates, on the assumption that a rotational direction is clockwise when seen from the rotational shaft 11a side, the internal threading gear 15 is rotated via the pinion gear 14. A thrust force is generated, by a screw principle, on the outer screw 16a of the screw shaft 16 when the inner screw member 15b of the internal threading gear 15 rotates. Accordingly, the screw shaft 16 moves in a direction indicated by an arrow $A_1$ of FIG. 3, without rotation, due to the effect of the flat portion 16b₁ of the spring contact portion 16b.

When the motor 11 rotates in a reverse direction, the screw shaft 16 moves in a direction indicated by an arrow $A_2$ of FIG. 3.

Figure 4A:
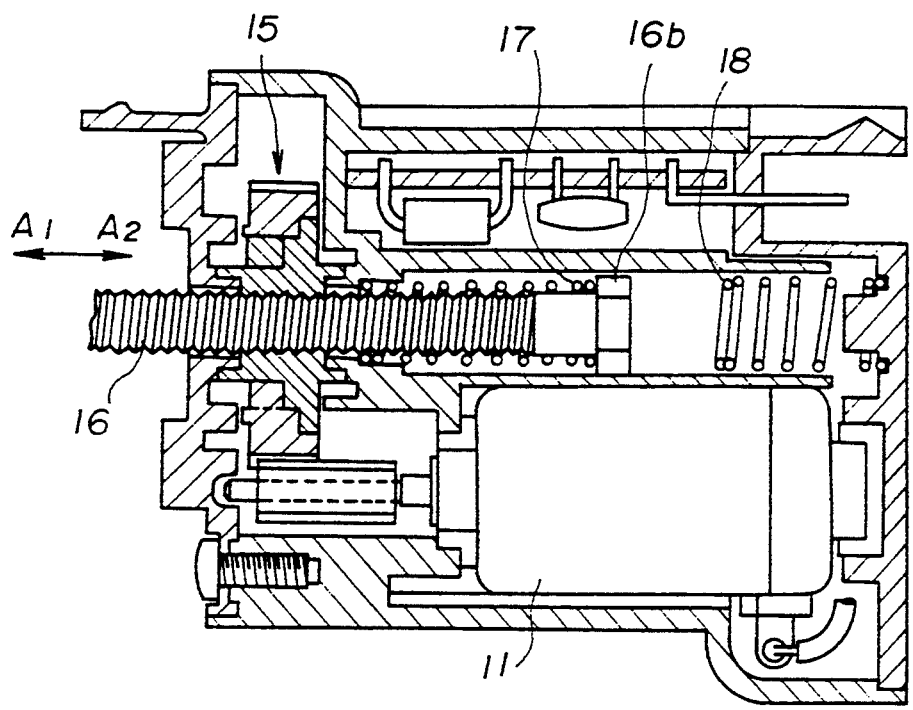
Figure 4B:
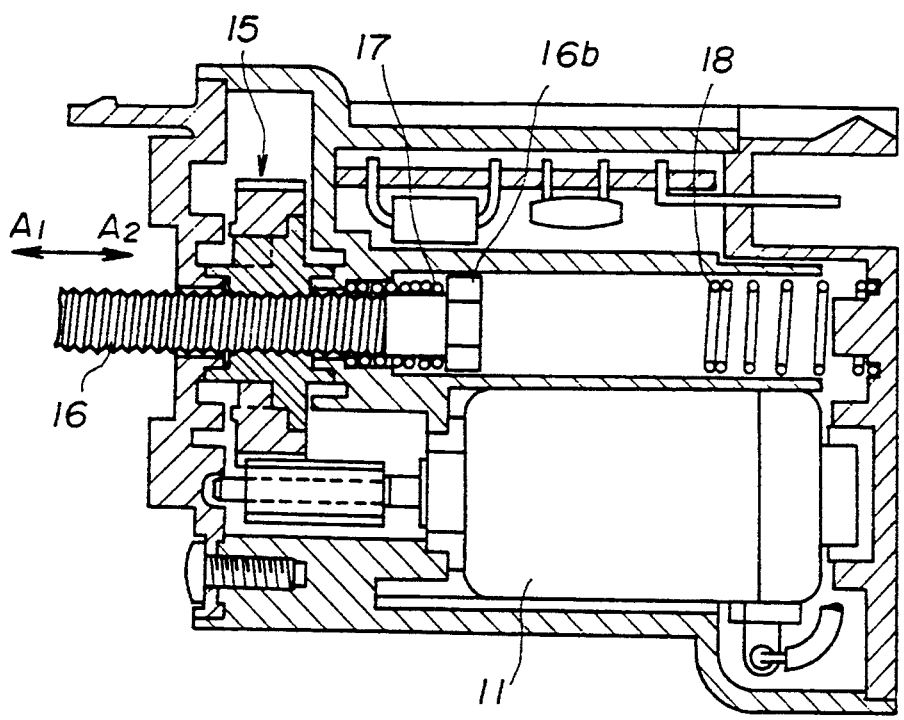

FIG. 4A shows a state where the spring contact portion 16b of the screw shaft 16 is engaged with the front spring 17, and FIG. 4B shows a state where the screw shaft 16 is moved to the end of its motion range.

If the screw shaft 16 moves in a direction indicated by the arrow $A_1$ from a position where the spring contact position 16b of the screw shaft 16 is situated between the front spring 17 and the rear spring 16, as shown in FIG. 4A, the spring contact portion 16b makes contact with an end of the front spring 17. If the motor 11 continues to rotate, the screw shaft also continues to move in the direction indicated by the arrow $A_1$ and thus the front spring is compressed by a pressing force of the spring contact portion 16b.

When the front spring is compressed, a resilient force of the front spring 17 is applied to the spring contact portion 16b in a direction the reverse of the moving direction of the screw shaft 16. This resilient force gradually increases as the compression of the front spring 17, caused by the movement of the screw shaft 16, progresses. Finally, as shown in FIG. 4B, when the screw shaft 16 reaches the end of its motion range in a direction indicated by the arrow $A_1$, the resilient force of the front spring 17, in a direction indicated by the arrow $A_2$, balances with a thrust force generated by the motor 11, and the screw shaft 16 stops.

As mentioned above, the movement of the screw shaft 16 is stopped by the resilient force of the front spring 17 and thus the moving speed of the screw shaft 16 is reduced resulting in a reduction of the rotational speed of the motor 11. By this reduction of the speed of the motor, an inertia of the rotational shaft of the motor 11 is reduced and thus a tightening is prevented of the outer screw 16a relative to the inner screw 15c.

When the screw shaft 16 moves in the direction indicated by the arrow $A_2$, the rear spring 18 functions similarly to the front spring 17. Accordingly, a tightening of the outer screw 16a relative to the inner screw 15c is prevented.

As mentioned above, the actuator is realized in which the screw shaft 16 is assumed to never mechanically lock when the screw shaft is forced to stop; the actuator using a simple mechanism such that the spring contact portion 16b is provided on the end of the screw shaft 16 and the front and the rear spring 17, 18 are provided along the screw shaft 16.

Figure 5:
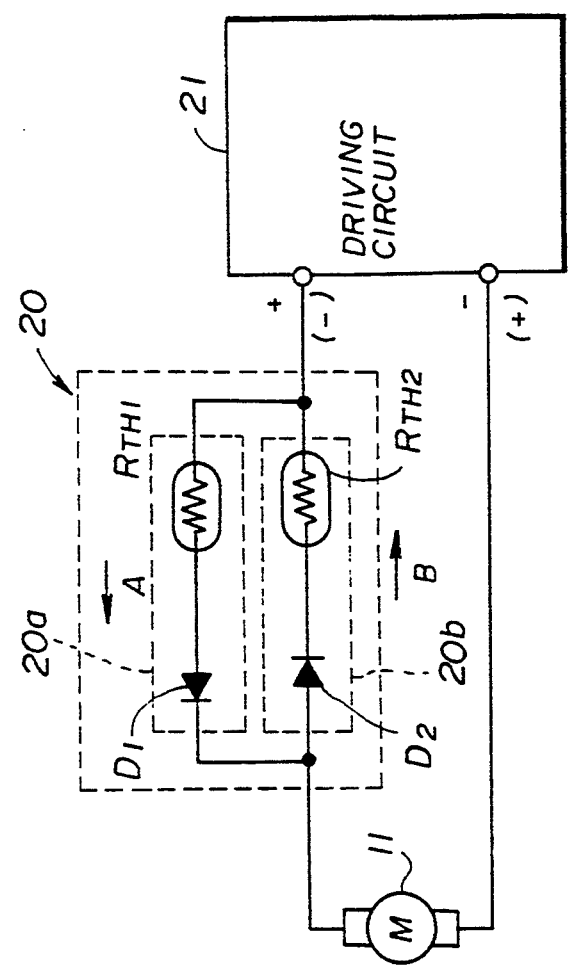
FIG. 5 is a circuit diagram of a motor protection circuit of the first embodiment according to the present invention.

Next, a description will be given, with reference to FIG. 5, of a motor protection circuit. FIG. 5 is a circuit diagram of a protection circuit formed on the circuit board 13 of the actuator shown in FIG. 3. In the figure, the reference numeral 11 denotes the DC motor to be protected, 20 a protection circuit, and 21 a driving circuit for the DC motor 11.

The driving circuit 21 is provided for supplying a driving current to the motor 11. The protection circuit is provided for protecting the DC motor 11 from overheating when the motor 11 is forced to stop while a driving current is being supplied to the motor 11. This condition may occur when the screw shaft (refer to FIG. 3) reaches either end of its stroke. The protection circuit limits off the current supplied to the motor 11 when an excessive current flows to the motor 11.

The DC motor 11 is connected to the driving circuit via the protection circuit 20. The driving circuit 21 supplies a current to the DC motor in either a normal or a reverse direction. When a current flows in a normal direction, the DC motor 11 rotates in a normal direction. When a current flows in a reverse direction, the DC motor rotates in a reverse direction.

The protection circuit 20 comprises a first serial circuit 20a and a second serial circuit 20b connected in parallel. The first serial circuit 20 a comprises a diode $D_1$, which is a rectifier, and a PTC thermistor $R_{TH1}$ connected in series. The diode $D_1$ is connected to the DC motor 11 via a cathode thereof and is connected to the driving circuit 21 via an anode thereof.

Similarly to the first serial circuit 20a, the second serial circuit 20b comprises a diode $D_2$, which is a rectifier, and a PTC thermistor $R_{TH2}$ connected in series. However, unlike in the first serial circuit 20a, the diode $D_2$ is connected to the DC motor 11 via an anode thereof and is connected to the driving circuit 21 via a cathode thereof.

By this arrangement of the diodes $D_1$ and $D_2$, a current flowing from the driving circuit 21 to the DC motor 11 passes through either one or the other of the first and second serial circuits 20a, 20b depending upon the direction of the current.

That is, if the flowing direction of the current corresponding to the normal rotation of the DC motor 11 is a direction from left to right (indicated by an arrow A in the figure) in a protection circuit 20 in the drawing, the current flows only through the first serial circuit 20a. A current corresponding to the reverse rotation of the DC motor 11 (indicated by an arrow B in the figure) flows only through the second serial circuit 20b.

By the above mentioned structure of the protection circuit 20, the DC motor is protected from an excess current by the PTC thermistor $R_{TH1}$ of the first serial circuit 20a when the DC motor 11 rotates in the normal direction. When the DC motor 11 rotates in the reverse direction, the PTC thermistor $R_{TH2}$ protects the DC motor from excess current. If current is flowing in one of the above two thermistors, the other thermistor is returned to the normal condition during the time when no current is flowing.

Therefore, if the direction of the current is switched from the normal direction to the reverse direction, and if the resistance of the PTC thermistor $R_{TH1}$ increases, current can flow via the PTC thermistor $R_{TH2}$ and the DC motor is protected from an excess current. There is no undesired effect of the used thermistor on the current, in an opposite direction of the current for example, and the normal operation can be performed with a desired protection of the motor.

Figure 6:
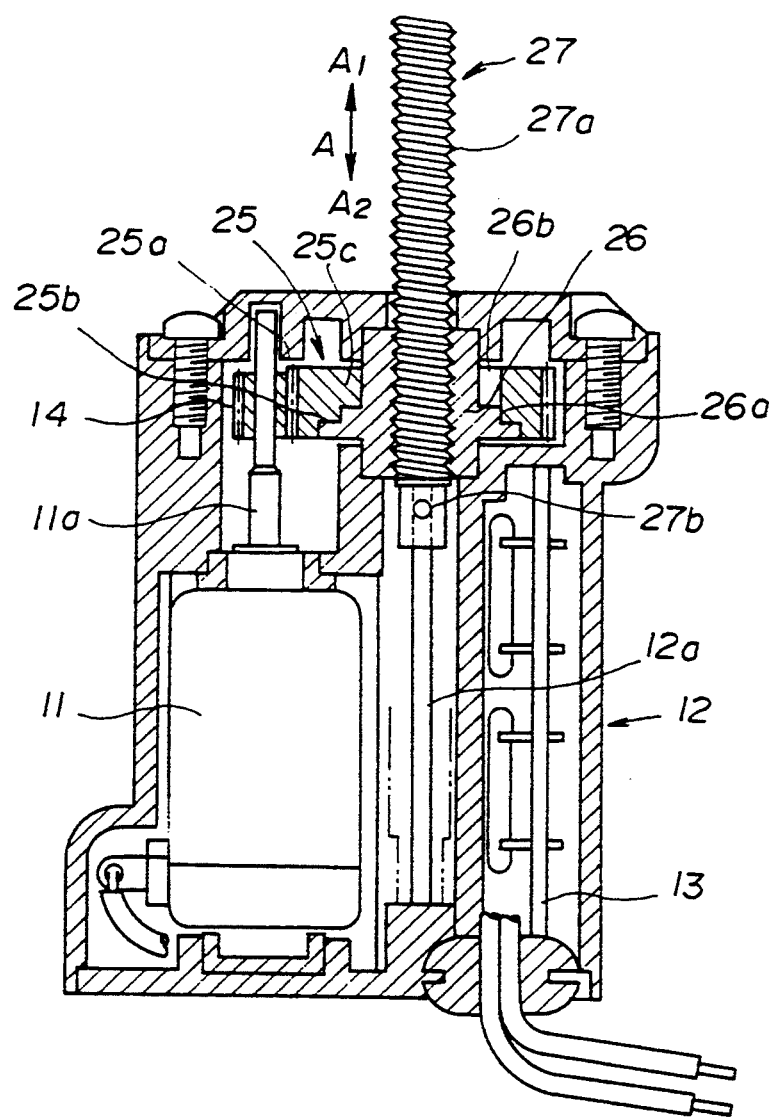
FIG. 6 is a cross sectional view of a second embodiment according to the present invention.

Next, a description will be given of a second embodiment of an actuator according to the present invention. FIG. 6 is a cross sectional view of the second embodiment of an actuator according to the present invention. In FIG. 6, parts that are the same as parts shown in FIG. 3 are given the same reference numerals from figure to figure, and descriptions thereof are be omitted.

A gear 25 in the figure corresponds to the internal threading gear 15. The gear 25 has a toothed portion 25a on outer periphery thereof; the gear 25 is situated inside a casing 12 so that the teeth portion 25a is engaged with a pinion 14. The gear 25 is formed with a stepped hole 25b on an inner side thereof.

An inner screw member 26 having a stepped portion 26a is fitted in the stepped hole 25b of the gear 25. The shape of the stepped portion 26a corresponds to the shape of the stepped hole 25b so that the gear 25 and the inner screw member 26 are relatively rotatable.

As shown in FIG. 7A and FIG. 7B, the stepped hole 25b is formed with a protrusion 25c and stepped portion 26a is formed with a protrusion 26b. The protrusions 25c and 26b are protruded so that they are engaged with each other at two points on their orbit. Supposing the inner screw member 26 stays at the same position and the gear 25 rotates in a direction indicated by an arrow A of FIG. 7A from a position where the protrusion 26b of the inner screw member 26 is engaged with the protrusion 25c of the gear 25, the protrusion 25c will be engaged with the protrusion 26b again after the protrusion 25c is rotated a predetermined angle $\theta$ shown in FIG. 7A.

The inner screw member 26 is formed with an internal threading 26c. An external threading 27a formed on an outer periphery of a screw shaft 27 is engaged with the internal threading 26c of the inner screw member 26.

A guide groove 12a is formed on an inner surface of the casing 12 along a moving direction of the screw shaft 27. A guide pin 27b is provided on the end of the screw shaft 27 so that the guide pin 27b is inserted in the groove 12a to prevent a rotation of the screw shaft 27. Additionally, the guide pin 27b contacts the inner screw member 26 so as to stop a movement of the screw shaft 27.

Next, a description will be given of an operation of the actuator of the second embodiment.

Similarly to the first embodiment, when the rotational shaft 11a of the motor 11 rotates, the gear 25 rotates via the pinion gear 14. Supposing the gear 25 and the inner screw member 26 are positioned as shown in FIG. 7A, the protrusion 25c of the gear 25 comes in contact with the protrusion 26b of the inner screw member 26 after the gear 25 has freely rotated a predetermined angle $\theta$ as shown in FIG. 7B. Then the inner screw member 26 starts to rotate with the gear 25 due to a pressing force of the protrusion 25c.

If the inner screw member 26 rotates, the screw shaft 27 engaged with the inner screw member 26 performs a linear motion (for example, in a direction indicated by an arrow $A_1$ of FIG. 6) as a rotational movement of the screw shaft 27 is prevented by means of the guide pin 27b. If the screw shaft continues to move, the screw shaft 27 is forced to stop due to the guide pin 27b coming into contact with the inner screw member 26. In this situation, the screw shaft and the inner screw member 26 are tightly tightened with respect to each other by screw principle.

In order to move the screw shaft in a direction indicated by an arrow $A_2$ of FIG. 6, the rotational shaft 11a of the motor 11 is rotated in the reverse direction. When the shaft 11a rotates in the reverse direction, the gear 25 rotates in the reverse direction via the pinion gear 14. After the gear 25 starts to rotate, the gear 25 rotates an angle $\theta$ with no load, and then the protrusion 25c of the gear 25 collides, with a certain speed with the protrusion 26b of the inner screw member 26. Accordingly, the inner screw member 26 receives an impact force and starts to rotate in the reverse direction, resulting in linear movement of the screw shaft 27 in the direction indicated by the arrow $A_2$.

The impact force generated by the collision of the protrusions 25c and 26b is sufficient to overcome the tightening torque of the screw shaft 27 and the inner screw member 26. That is, a torque greater than the unfastening torque is obtained by the impact force generated by the collision of the protrusion 25c and the protrusion 26b.

Therefore, the necessary unfastening torque is obtained by a simple mechanism such as forming of protrusions on the gear and the inner screw member, and thus an actuator having an inexpensive and reliable mechanism for stopping an output shaft is realized.

It should be noted that an actuator performing a further improved starting operation can be realized by a combination of the first embodiment and the second embodiment mentioned above.

The present invention is not limited to the specifically disclosed embodiments, and variations and modifications may be made without departing from the scope of the present invention.

What is claimed is:

1. An actuator comprising:
   a reversible electric motor having a rotational shaft;
   an output shaft provided with an external threading formed on an outer periphery thereof;
   a connecting member, having an internal threading engaged with said external threading of said output shaft, coupled to said rotational shaft of the motor so as to rotate about said output shaft;
   a deceleration means for decelerating a moving speed of said output shaft at the end of a motion range of said output shaft so that said moving speed of said output shaft gradually decreases near the end of the motion range and that said output shaft stops upon reaching the end of the motion range; and
   a protection circuit electrically connected to said motor for protecting said motor from overheating due to an excessive current flowing to said motor by limiting a current flowing to said motor, which protection circuit comprises a first serial circuit including a first rectifier allowing a current passing in a normal direction to said motor and a first protecting element whose resistance increases in response to an increase of the current flowing to said motor, said first rectifier and said first protecting element being connected in series; and a second serial circuit including a second rectifier allowing a current passing in a reverse direction to said motor and a second protecting element whose resistance increases in response to an increase of the current flowing to said motor, said second rectifier and said second protecting element being connected in series, and said first serial circuit and said second serial circuit being connected in parallel.

2. The actuator as claimed in claim 1, wherein said deceleration means comprises a resilient member provided along a moving direction of said output shaft, said resilient member being engaged with said output shaft when said output shaft is moved to a predetermined position, and applying a predetermined load to said output shaft in an opposite direction of the moving direction of said output shaft when said output shaft reaches the end of its motion range.

3. The actuator as claimed in claim 2, wherein said resilient member comprises a coil spring having a resilience in a moving direction of said output shaft.

4. The actuator as claimed in claim 3, wherein said output shaft further comprises a protrusion, formed on one end of said output shaft, protruding in a radial direction of said output shaft, and wherein said coil spring is fitted over the outer periphery of said output shaft so that said one end of said output shaft comes into contact with said coil spring.

5. The actuator as claimed in claim 1, wherein said first and said second protecting elements comprise a positive temperature coefficient thermistor.

6. The actuator as claimed in claim 1, further comprising an impact applying means for applying an impact force to said connecting member in a rotational direction of said connecting member when said connecting member starts to rotate, said impact force capable of generating a large torque sufficient to start a reversed rotation of said connecting member.

7. The actuator as claimed in claim 6, wherein said impact applying means is provided in said connecting member, and said connecting member comprises an internal screw member having said internal threading formed on an inner surface thereof and a first protrusion formed on an outer surface thereof and a gear member having a second protrusion, said second protrusion being engaged with said first protrusion, formed on an inner surface thereof and being coupled with a rotational shaft of said motor so as to rotate in response to a rotation of said rotational shaft, the rotational force of said gear member being communicated by the engagement of said first protrusion and said second protrusion, said second protrusion engaging with said first protrusion again after rotating a predetermined angle with no load when said gear member starts to rotate in a reverse direction during a restarting routine.

8. An actuator comprising;
a reversible electric motor having a rotational shaft;
a protection circuit electrically connected to said motor for protecting said motor from overheating due to an excessive current flowing to said motor by limiting a current flowing to said motor, which protection circuit comprises a first serial circuit including a first rectifier allowing a current passing in a normal direction to said motor and a first protecting element whose resistance increases in response to an increase of the current flowing to said motor, said first rectifier and said first protecting element being connected in series; and a second serial circuit including a second rectifier allowing a current passing in a reverse direction to said motor and a second protecting element whose resistance increases in response to an increase of the current flowing to said motor, said second rectifier and said second protecting element being connected in series, and said first serial circuit and said second serial circuit being connected in parallel;
an output shaft provided with an external threading formed on an outer periphery thereof;
a connecting means for connecting said rotational shaft of said motor to said output shaft, including a connecting member having internal threading engaged with said external threading of said output shaft and coupled to said rotational shaft of said motor so as to rotate about said output shaft;
a resilient member provided along a moving direction of said output shaft, said resilient member being engaged with said output shaft when said output shaft is moved to a predetermined position and applying a predetermined load to said output shaft in an opposite direction of the moving direction of said output shaft when said output shaft reaches the end of moving range; and
an impact applying means, provided in said connecting member, for applying an impact force to said connecting member in a rotational direction of said connecting member when said connecting member starts to rotate, said impact applying means including an internal screw member having said internal threading formed on an inner surface thereof and a first protrusion formed on an outer surface thereof, and a gear member having a second protrusion, being engaged with said first protrusion, formed on an inner surface thereof and being coupled with said rotational shaft of said motor so as to rotate in response to a rotation of said rotational shaft, the rotational force of said gear member being communicated by the engagement of said first protrusion and said second protrusion, said second protrusion being engaged with said first protrusion again after rotating a predetermined angle with no load when said gear member starts to rotate in a reverse direction during a restarting routine.

9. A protection circuit electrically connected to a reversible electric motor which is used for a power source of an actuator, said protection circuit comprising:
a first serial circuit including a first rectifier allowing a current passing in a normal direction to said motor and a first protecting element whose resistance increases in response to an increase of the current flowing to said motor, said first rectifier and said first protecting element being connected in series; and
a second serial circuit including a second rectifier allowing a current passing in a reverse direction to said motor and a second protecting element whose resistance increases in response to an increase of the current flowing to said motor, said second rectifier and said second protecting element being connected in series, said first serial circuit and said second serial circuit being connected in parallel.

10. The protection circuit as claimed in claim 9, wherein said first and said second protecting elements comprise a positive temperature coefficient thermistor.

* * * * *